# (12) United States Patent
Lind

(10) Patent No.: US 7,258,824 B2
(45) Date of Patent: Aug. 21, 2007

(54) METHOD FOR CONTROLLING THE INJECTION PROCESS AND INJECTOR UNIT

(75) Inventor: Andreas Lind, Galgenen (CH)

(73) Assignee: Netstal-Maschinen AG, Nafels (CH)

( * ) Notice: Subject to any disclaimer, the term of this patent is extended or adjusted under 35 U.S.C. 154(b) by 162 days.

(21) Appl. No.: 10/467,233

(22) PCT Filed: Jul. 24, 2001

(86) PCT No.: PCT/CH01/00458

§ 371 (c)(1),
(2), (4) Date: Jan. 9, 2004

(87) PCT Pub. No.: WO02/062555

PCT Pub. Date: Aug. 15, 2002

(65) Prior Publication Data

US 2004/0109918 A1    Jun. 10, 2004

(30) Foreign Application Priority Data

Feb. 7, 2001 (CH) .................................... 0206/01
Jul. 18, 2001 (CH) .................................... 1324/01

(51) Int. Cl.
*B29C 45/20* (2006.01)
*B29C 45/50* (2006.01)
*B29C 45/77* (2006.01)
(52) U.S. Cl. ................. 264/40.5; 264/40.7; 264/328.1; 425/145; 425/562
(58) Field of Classification Search ............... 264/40.4, 264/40.5, 51, 328.1, 40.7; 425/145, 149, 425/562, 564
See application file for complete search history.

(56) References Cited

U.S. PATENT DOCUMENTS 3,052,925 A    9/1962    Bronnenkant et al.

(Continued)

FOREIGN PATENT DOCUMENTS

EP    0 513 774 A2    11/1992

(Continued)

OTHER PUBLICATIONS

Rosato et al., Injection Molding Handbook, 2$^{nd}$ edition, 1995, International Thomson Publishing, pp. 63-65,162-165,229-237.*

(Continued)

*Primary Examiner*—Jill L. Heitbrink
(74) *Attorney, Agent, or Firm*—Finnegan, Henderson, Farabow, Garrett & Dunner LLP

(57) ABSTRACT

The invention relates to an injector unit and a method for the control of the injection process into the cavities of injection moulding tools. The novel solution permits the injection of thin-walled injection moulding pieces (76, 77), with both electrically- and hydraulically-driven injector screws. One of the most important features thereof is the active selection of the opening time of the locking system at an optimal pressure in the compression chamber, preferably in the region of the upper half of the compression. The volumetric transfer flow is thus significantly improved in thin-walled injection moulding pieces (76, 77). Above all the melting pressure in the tool, the flow speed and the useful flow path in the cavities are increased.

20 Claims, 11 Drawing Sheets

Figure 1:
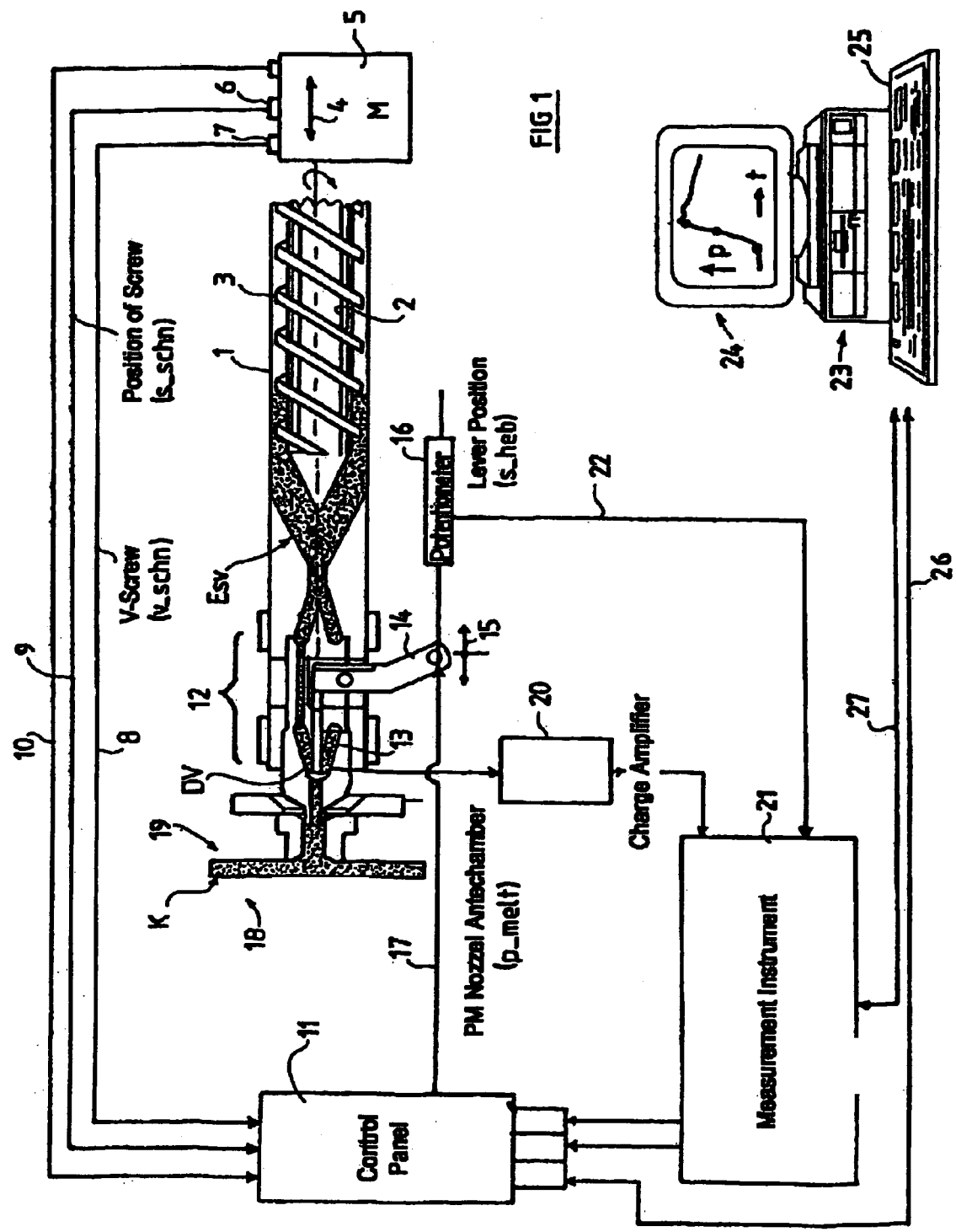

U.S. PATENT DOCUMENTS 5,194,195 A * 3/1993 Okushima .................. 264/40.1
5,266,247 A * 11/1993 Yokota ...................... 264/40.4
5,911,924 A    6/1999 Siegrist et al.

FOREIGN PATENT DOCUMENTS

EP          0 647 175 B1    4/1995
JP             2-81617    *   3/1990
WO           01/03906    *   1/2001
WO        WO 01/03906 A1    1/2001

OTHER PUBLICATIONS

Lind, A. "Besseres Regelverhalten und Kürezere Zykluszeiten Erhöhen Produktivität," *Plastverarbeiter* 38(7):44-46 (1988).
International Search Report (PCT/CH 01/00458) dated Oct. 22, 2001.

* cited by examiner

METHOD FOR CONTROLLING THE INJECTION PROCESS AND INJECTOR UNIT

TECHNICAL BACKGROUND

This invention relates to a method of controlling/regulating the injection stroke and compression stroke for the injection process in the cavities of injection molds, in particular for injection of thin-walled injection molded articles using an electrically or hydraulically driven injection screw; this invention also relates to an injection unit, in particular for producing thin-walled injection molded articles in injection molds, with a controllable active closure for the nozzle opening and an electrically or hydraulically driven injection screw.

BACKGROUND INFORMATION

The volume flow transfer behavior from the screw antechamber into the cavity of the injection mold during the injection phase depends on numerous parameters and is acknowledged in the technical world as being a complex process. Results of basic experiments conducted by the present authors were published in *Plastverarbeiter* [Plastics Processor], volume 41 (1990). Reference is made below to this publication. Measurements have shown that there are definite differences between the volume actually introduced into the cavity and the volume obtained on the basis of geometric data and the forward speed of the screw.

There have been unsuccessful attempts in the past to calculate an optimum injection volume flow profile for mold filling by using programs. The present authors consider the main factor in this difference to be the compressibility of the melt and machine deformation. Based on our own investigations, it is proposed in the article that the deformation, such as that based on the difference between the measured total deformation and the calculated melt compression, first be considered as elastic machine deformation. It has been found that elastic machine deformation is of an order of magnitude similar to that of melt compression in the range of low acting pressures. Before performing the measurements, proper functioning of the backflow valve for the entire molding path was ensured. Nevertheless a difference amounting to a factor of more than two was obtained between the theoretical flow path and the actual flow path. The proposed derivation of the actual flow front position from the theoretical position is based on the following simplifications:

At each discrete point in time in the dynamic injection process, the measured variables are regarded as quasi-static. At each point in the melt, the same pressure prevails as in the screw antechamber. The calculated flow distance was thus slightly below that actually measured. The following reasons are given:

a) Contrary to the original assumption, different pressures prevail in the screw antechamber and in the cavity itself.

b) The pressure is the cavity is not constant over the flow path. It decreases in an approximately linear ratio from the gate to the flow front.

c) The volume in the screw antechamber is steadily reduced during the injection process.

d) The plasticated mass was selected to be large in comparison with the mass of the molding in order to reduce the errors described here.

These experiments were conducted with final pressures of 800, 1100 and 1500 bar, whereby the development of the pressure in the compression space over time was varied in the range of 20 to 50 milliseconds as a function of the metering volume. The rate of increase in volume flow increased with a drop in the final pressure level. The outgoing volume flow developed more rapidly accordingly. In the remaining curve the changes in volume flow declined and developed into a linear curve. The transition would occur at an earlier or later point in time, depending on the backpressure level, and at a greater or lesser volume flow level. The changes in volume flow over time increased with an increase in the final pressure level in the linear range. It can thus be concluded that, when applied to an actual injection molding process, this finding would mean that the volume flow entering the mold would show a linear increase with an increase in the flow length of the melt in the mold after a startup phase. Furthermore, with an increase in the backpressure end value, the difference in comparison with the theoretical value of the volume flow would become greater. This situation is emphasized as being of particular interest because, based on practice, filling times have undeniably increased. According to the technical publication cited above, an increase in filling time must be expected in particular when molded parts having small cross sections are unmolded. Developments over the past decade, in somewhat simplified terms, have emphasized two trends:

In the case of injection molding machines using a hydraulic drive, inexpensive machines have become established for lower quality demands and injection molded articles having thick walls. It has been possible to meet the highest quality demands only with suitably designed and expensive machines, in particular for injection molded articles having thin walls.

It has, interestingly enough, been impossible to use electrically driven machines to manufacture thin-walled injection molded articles to meet the highest demands.

Production of thin-walled injection molded articles has remained a specialty for hydraulic machines in the higher price class. The dynamics of the moving mass forces during injection can be controlled more easily with these machines.

WO 01/03906 is based on an injection molding method with which plastic under pressure is injected from a relatively large antechamber, which can be sealed off, into a mold cavity after opening the gate. The purpose was to fill the mold cavity rapidly when producing thin and small injection molded articles, where the speed of the injection plunger should not play any role at all or should play only a subordinate role. The known state of the art is described in this WO patent as follows:

"If, even before opening a gate, a pressure comparable to the pressure in the mold interior has been established in front of the gate, this results only in the mold being filled partially at first due to expansion of the plastic in the antechamber until the effect of the forward feed of the screw is manifested after a slight time lag."

WO 01/03906 proposes as an improvement that the pressure in the antechamber be increased to more than 1500 bar, and in particular that the volume of the antechamber not be reduced to a great extent, as is conventional in the injection molding operation, but instead that it be maintained entirely or for the most part. The mold cavity here is filled only by a process of adiabatic expansion of the plastic material that has collected in the large antechamber and is under a high pressure. The adiabatic expansion results in cooling by 30° C. and a drop in pressure to the desired final range of 500 bar. According to one example, the antechamber may be up to 45 times larger in relation to the mold cavity, i.e., 30 to 40 articles can be produced with one antechamber filling. For most applications, a corresponding dwell time of hot plastic melt in the antechamber and an overheating of 30° C. would not be acceptable. Therefore, this design can be used only in very special cases.

European Patent 0 513 774 describes another state-of-the-art method using a hydraulic drive for stepwise control of a sequence of injection cycles with the goal that the dwell pressure always matches the dwell pressure of the preceding injection molding cycle. An admission pressure is generated between the injection screw and the casting mold due to the fact that a switching valve is reached by the time of reaching the pressure corresponding to the previous cycle. After opening the switching valve, the pressure collapses during the metering operation and is increased again according to the preceding cycle. The buildup of the admission pressure and the dwell pressure takes place completely independently with the single goal of achieving values as in the previous cycle. Such a method is not advantageous for thin-walled articles.

EXPLANATION OF THE INVENTION

This invention is based on the object of developing a method and an injection unit which will yield an improvement in the injection process, in particular for the production of thin-walled injection molded articles, without any restriction on the scope of application.

The inventive method is characterized in that the compression stroke is converted without interruption into the injection stroke, and an active closure is opened in a controlled manner at an optimum pressure in the compression space and/or with optimum melt compression and the transition from melt compression to volume flow transfer is being established, the active closure being opened as suddenly as possible.

The inventive injection unit is characterized in that it has control/regulating means for a two-step uninterrupted linear movement for a compression stroke and for an injection stroke of the injection screw, whereby the active closure can be operated between the compression stroke and the injection stroke, and the active closure has electric or hydraulic drive means, for the most sudden possible opening of the active closure.

According to an especially advantageous embodiment of this method, the opening point in time of the active closure is selected so that the effect of reflected pressure waves in front of the nozzle hole, i.e., the mold nozzle, is prevented. The present inventor has recognized that the highly dynamic process, in particular the startup process, has been investigated in all conceivable directions in the state of the art, but in doing so the active influence on one of the most important parameters, namely the dynamic response of the closure, has been disregarded. All previous experiments by the present applicant have shown that in the case of injection molded articles having thick walls, the necessarily greater complexity for the active closure is questionable economically because the possible improvements associated with it are relatively minor. It has been found that the advantage is greater, the thinner the walls of the part to be injected. This allows two results: First, in the case of hydraulically driven machines, it is possible to produce thin-walled parts of an extremely high quality by injection molding with a lower structural complexity and with less control technology for the entire machine but with a relatively minor increase in expense for the control of an active closure. Second, thin-walled parts of the highest quality can for the first time be produced by injection screws driven by electric motor as well as by those driven with a hydraulic drive. The relevant basic research has so far been conducted primarily with articles having thicker walls, which are less problematical, so it was not recognized that an important part of the compression energy immediately after automatic uncontrolled opening of a spring-loaded closure can no longer be converted into volume velocity by creating a reflected pressure wave in front of the nozzle hole and/or the mold nozzle. In the state of the art, the hydraulic pressure applied in the screw antechamber was converted to compression only inadequately in the phase of the greatest pressure. This is because the volume flow transfer had already taken place during the pressure buildup.

In the second case according to the citation from WO 01/03906, a positive effect could not be achieved because it was never possible to bring the transition from pressure buildup in the antechamber to the volume flow transfer under control. WO 01/03906 also controls the transition by a radical method by not taking into account the effect on the screw forward feed in the volume flow transfer.

This novel inventive method proposes the active injection cycle be performed in two phases, where the compression stroke is the first phase and the injection stroke is the second phase. The secret of this novel method is thus that the two phases are not created by artificial interruptions in the linear movement of the injection screw but instead by controlling/opening the active closure in a manner that is controlled as a function of pressure and/or time. This allows the dynamics of the mass forces accelerated during the compression stroke to be utilized maximally to support the injection stroke. In an exaggerated image, this novel method proposes that tension be applied to a compression spring with the greatest possible dynamics, that the front end be released in the range of the greatest tension and that the entire spring be pushed forward by utilizing the dynamics. Relaxation of the spring then no longer occurs at the site of tension buildup but instead the relaxation takes place at a more forward location. When applied to the injection process, it has thus become possible to shift the expansion of the compressed injection molding material into the mold itself, which explains the surprisingly positive effects, namely:

a better volume flow transfer an increase in flow rate more rapid filling of the mold a long flow path at a higher flow rate a great pressure buildup in the mold, especially in the case of extremely thin-walled articles.

With this novel inventive method, the energy expended is maximally converted into compression of the melt for the compression stroke. Subsequently the compressed melt is transferred to the mold with the greatest possible kinetic energy due to almost abrupt opening at an optimum melt pressure, and the resulting maximum speed is utilized for the volume flow transfer from the screw antechamber into the mold cavities. If the compression energy and/or the expansion of the melt is not implemented until the melt is inside the mold, this increases the melt velocity in the mold accordingly. Preliminary laboratory experiments on very thin-walled articles have already shown that the melt flow rate in the mold is increased significantly with this novel method. The melt travels a greater distance in a shorter period of time, which has been confirmed by appropriate sensors for ascertaining the position of the particular flow front over time. Another essentially plausible explanation for the surprising effect of the inventive embodiment is also that, to put it in negative terms, the effect of the cooled wall parts of the cavity is greater as the walls of the part become thinner. If the closure opens passively and usually much too soon, especially even at a relatively low compression, this leads to rapid cooling in the boundary zones at the inlet area of the mold cavity and immediately creates inferior flow conditions for the following melt flow. This novel method makes it possible to largely eliminate this negative phenomenon.

Preferably according to the novel method, a maximum steepness of the pressure rise until active opening of the closure system is selected within the range of the allowed operating parameters. In the entire pressure increase phrase, the maximum possible compression work is thus expended. Immediately after opening the closure, both the stored compression energy and the maximum delivery effect of the injection screw on the plastic compression and/or on all accelerated masses is available for a maximum of volume flow transfer, and this creates the optimum startup//oncoming flow conditions in the flow channels as described above. If the injection screw has an electric motor drive or a hydraulic drive and the pressure buildup occurs before opening the active closure with maximum dynamics, then the highest possible kinetic energy is available at the beginning of the injection if the dynamics of the moving parts is maintained without interruption for the injection process. This is equally true for the hydraulic drive and the elective drive of the injection screw. This novel method opens up a previously excluded area for electrically operated machines. This is especially valuable because electric drives require much less energy per injection molded article produced in relation to hydraulic drives. The compressing stroke for each injection cycle amounts to 40% of the total screw stroke. The pressure buildup in the compression space and the injection process during and immediately after the opening time of the active closure take place without interruption and at maximum motor power. It is important here that the drive means for the injection screw are selected so that the duration of the pressure buildup is short. The linear drive for the injection screw may be designed as a servo motor with regulation via the speed input. The novel method, however, also allows the use of an inexpensive drive motor. According to previous experiments, the best choice has been to use a needle valve as the active closure. The active closure can then be arranged at the nozzle outlet of the injection screw or in the inlet area of the cavity of the injection mold. This has the great advantage for practical use that in may cases this novel method can also be implemented by adapting or remodeling molds and without any changes in the machine.

BRIEF DESCRIPTION OF THE INVENTION

Figure 2C:
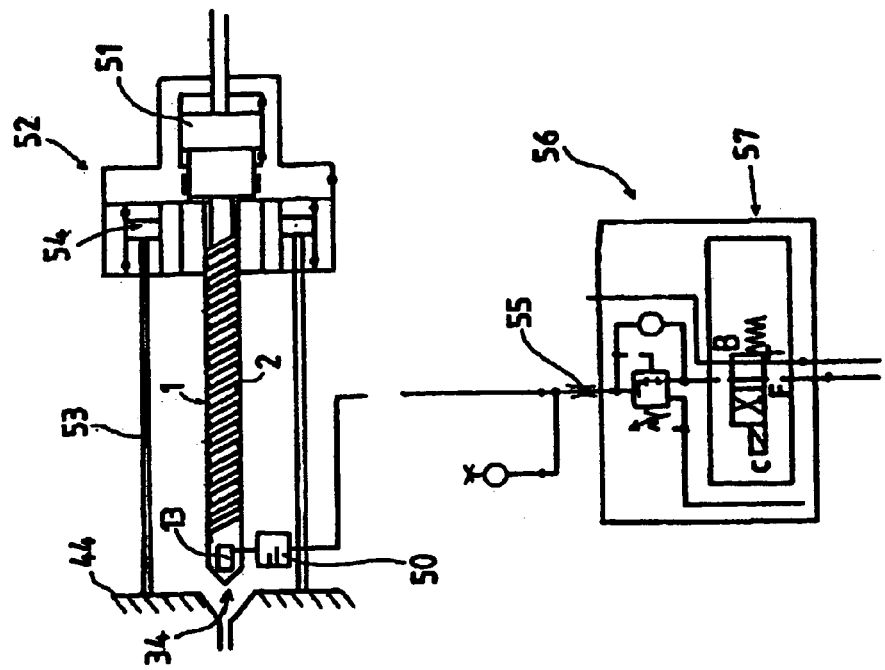
Figure 2A:
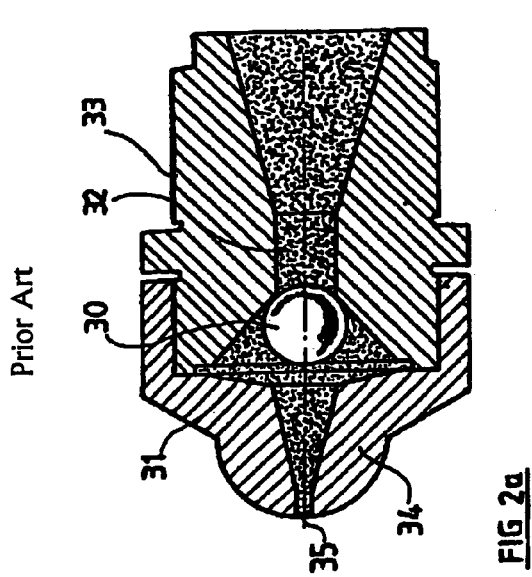
Figure 2B:
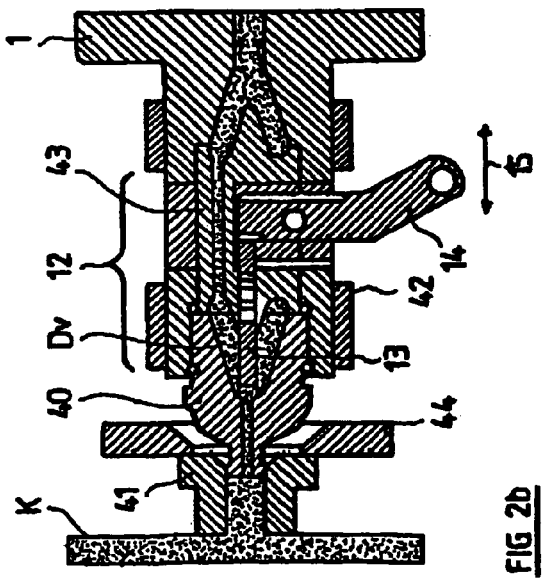
Figure 3:
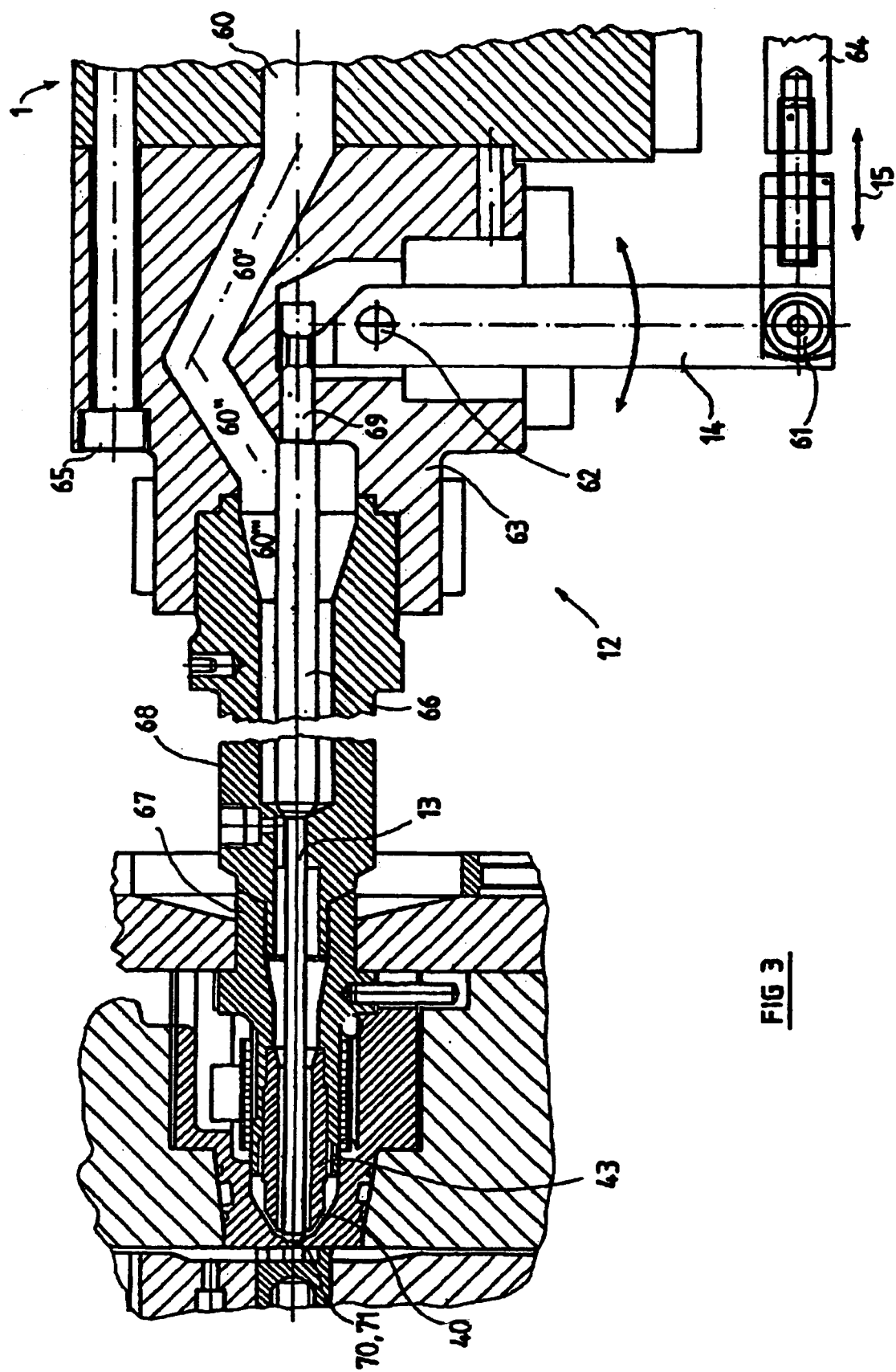
Figures 4A, 4B:
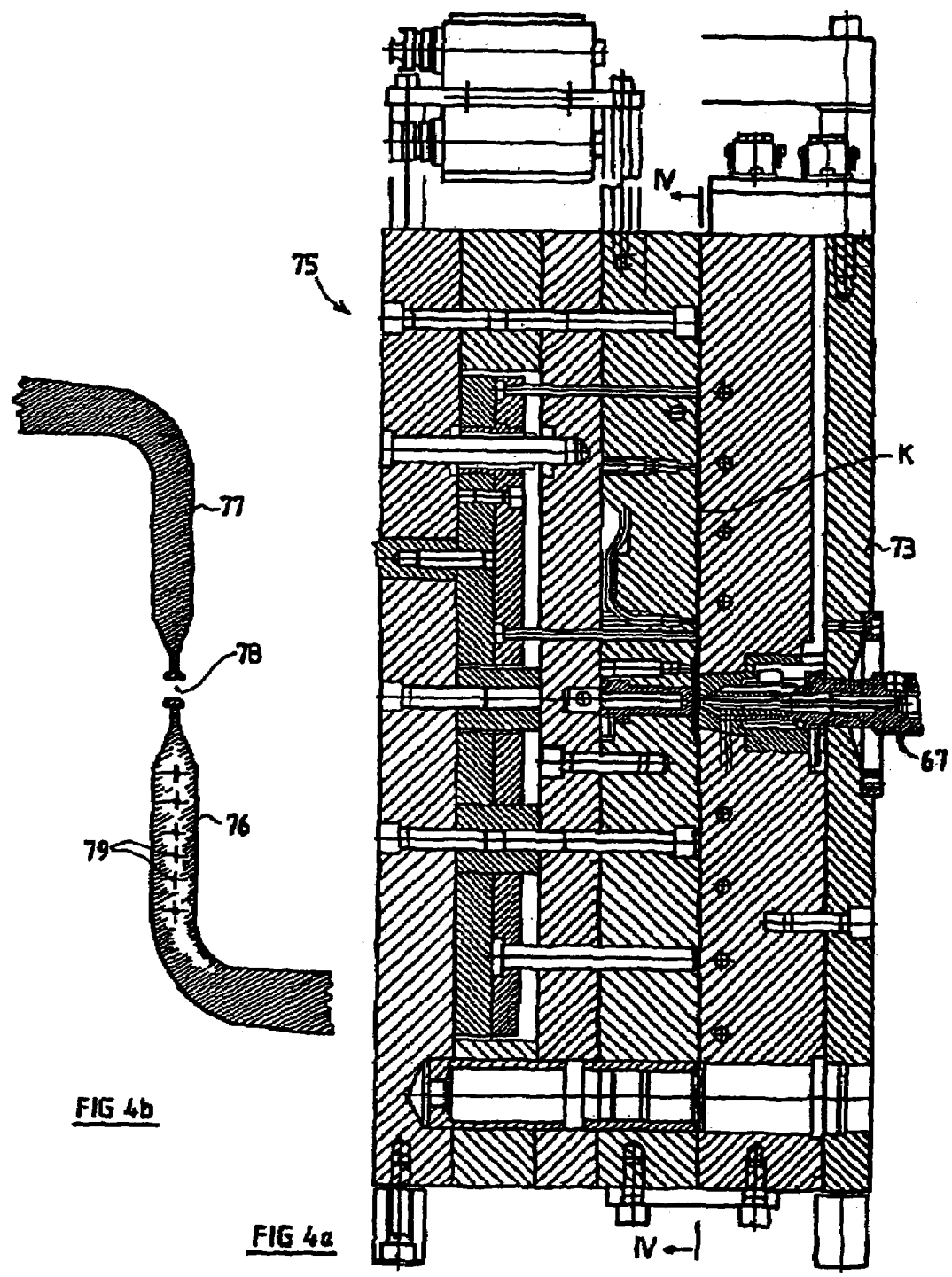
Figure 5A:
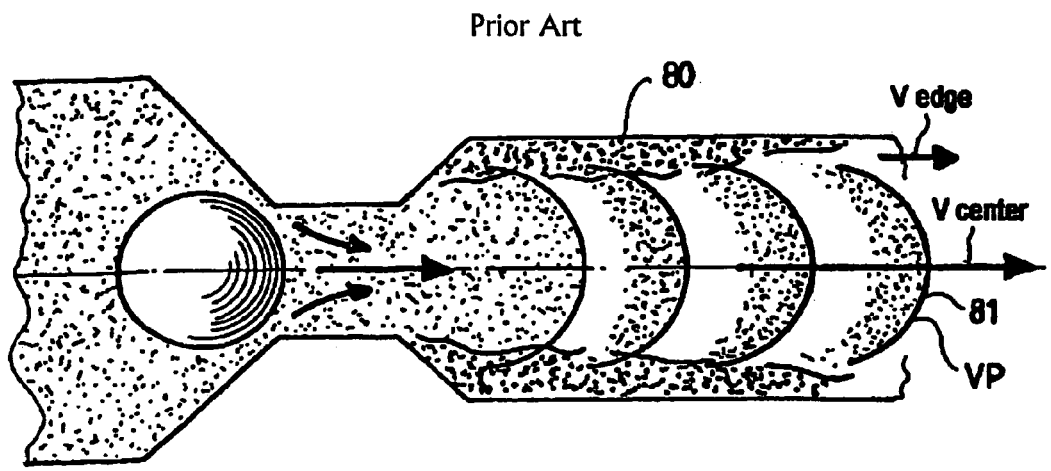
Figure 5B:
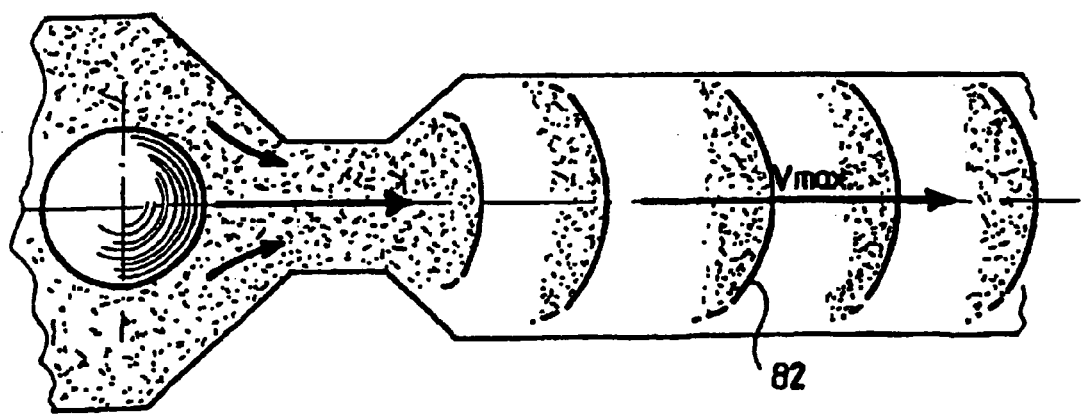
Figure 6:
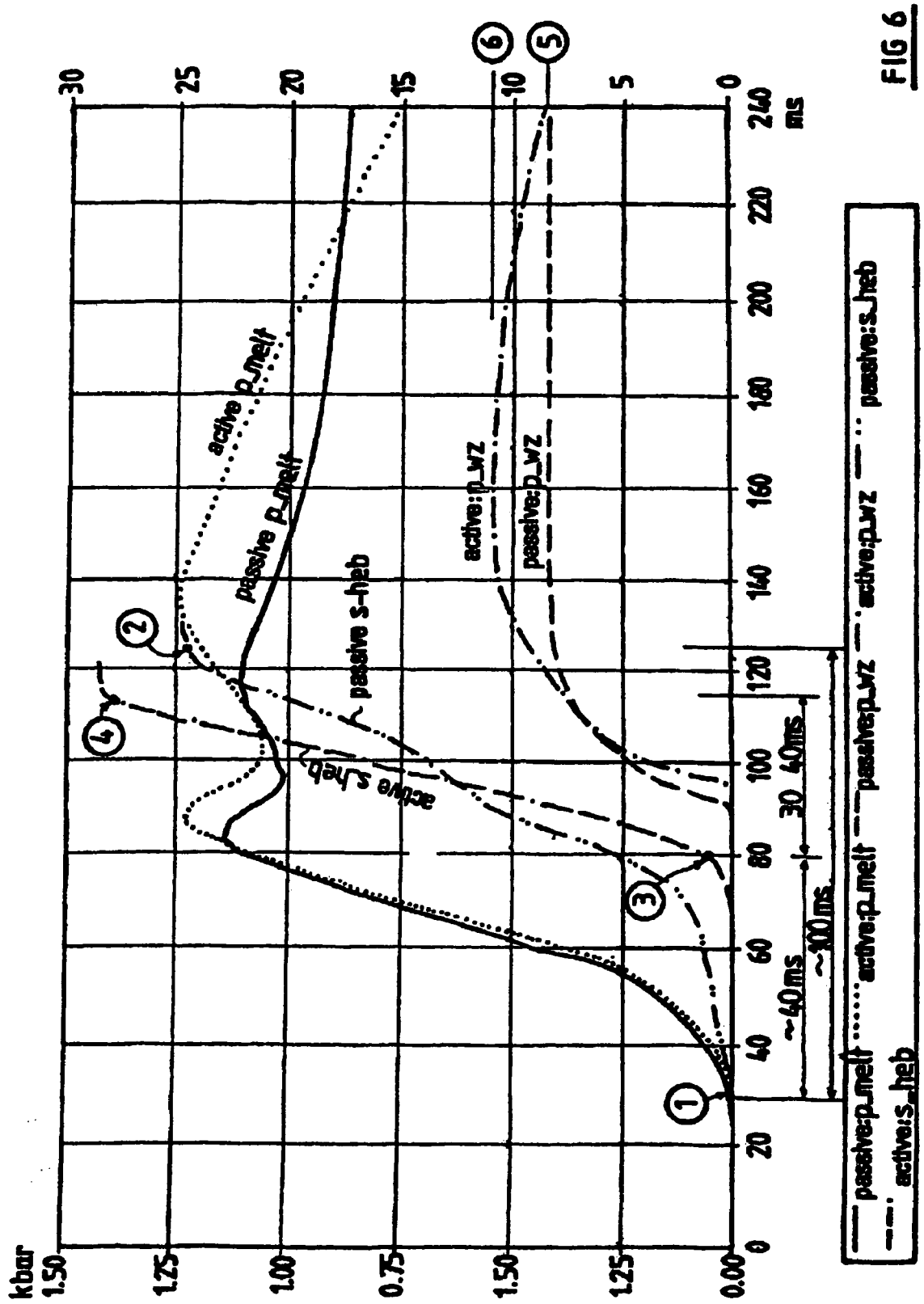
Figure 7:
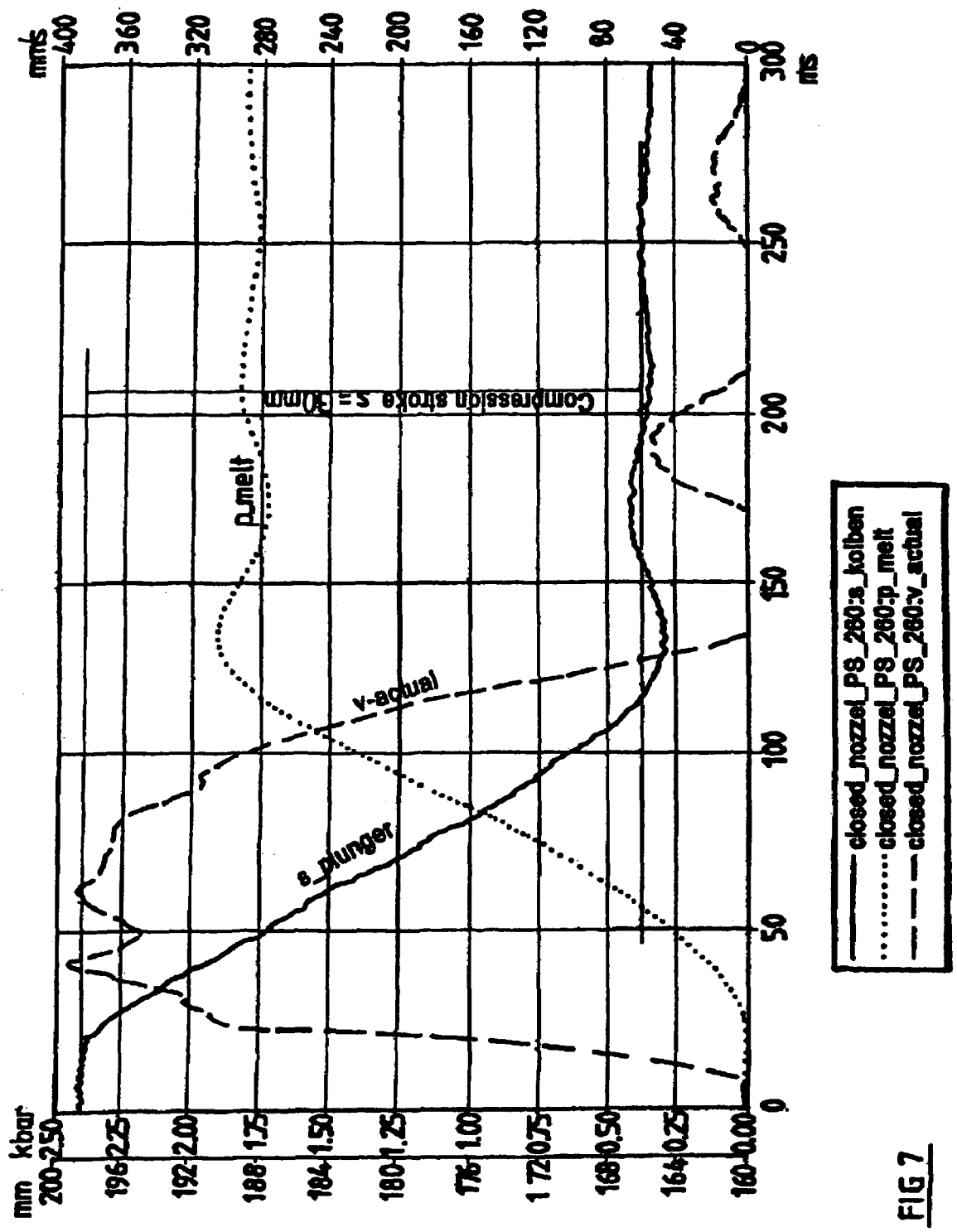
Figure 8:
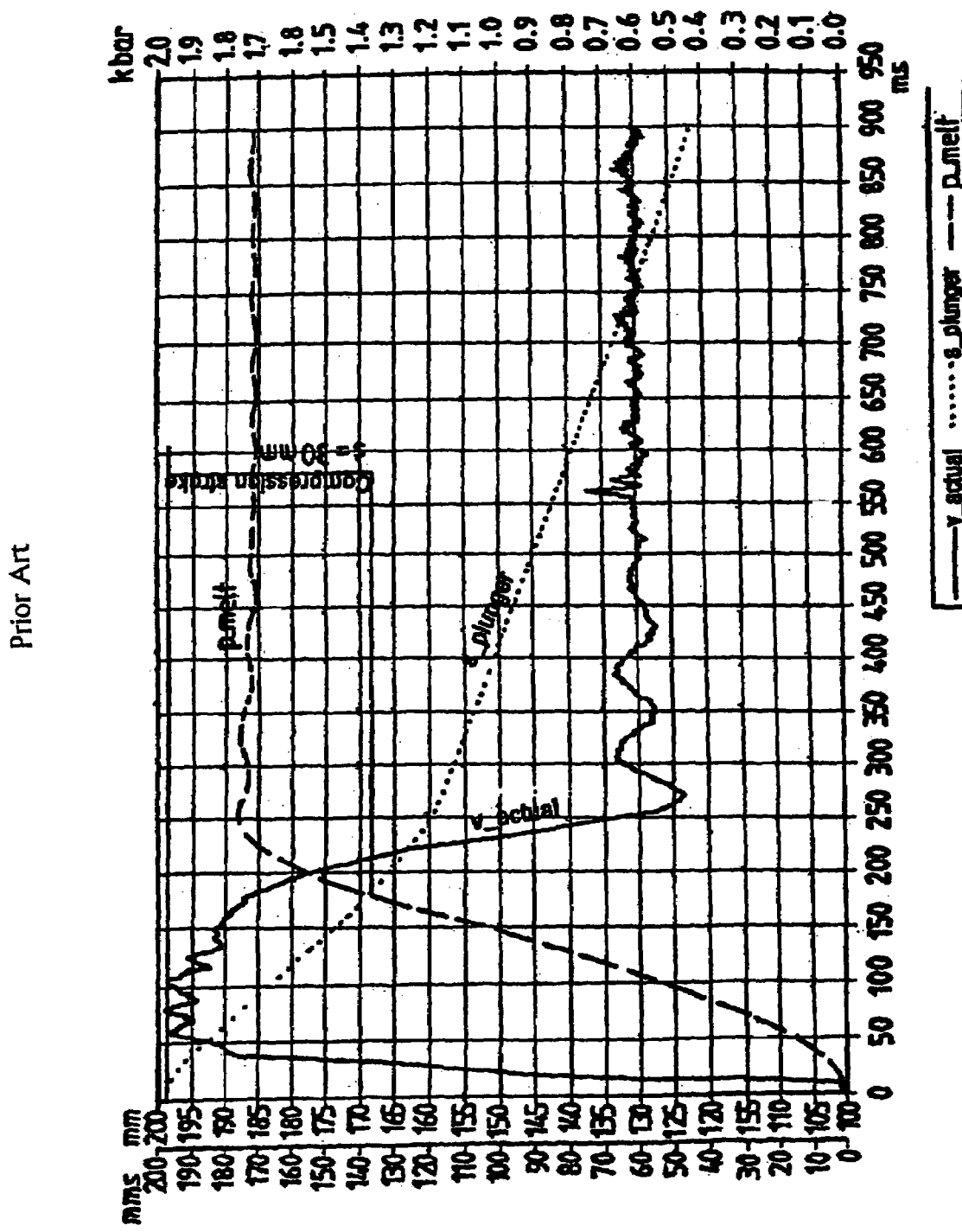
Figure 9:
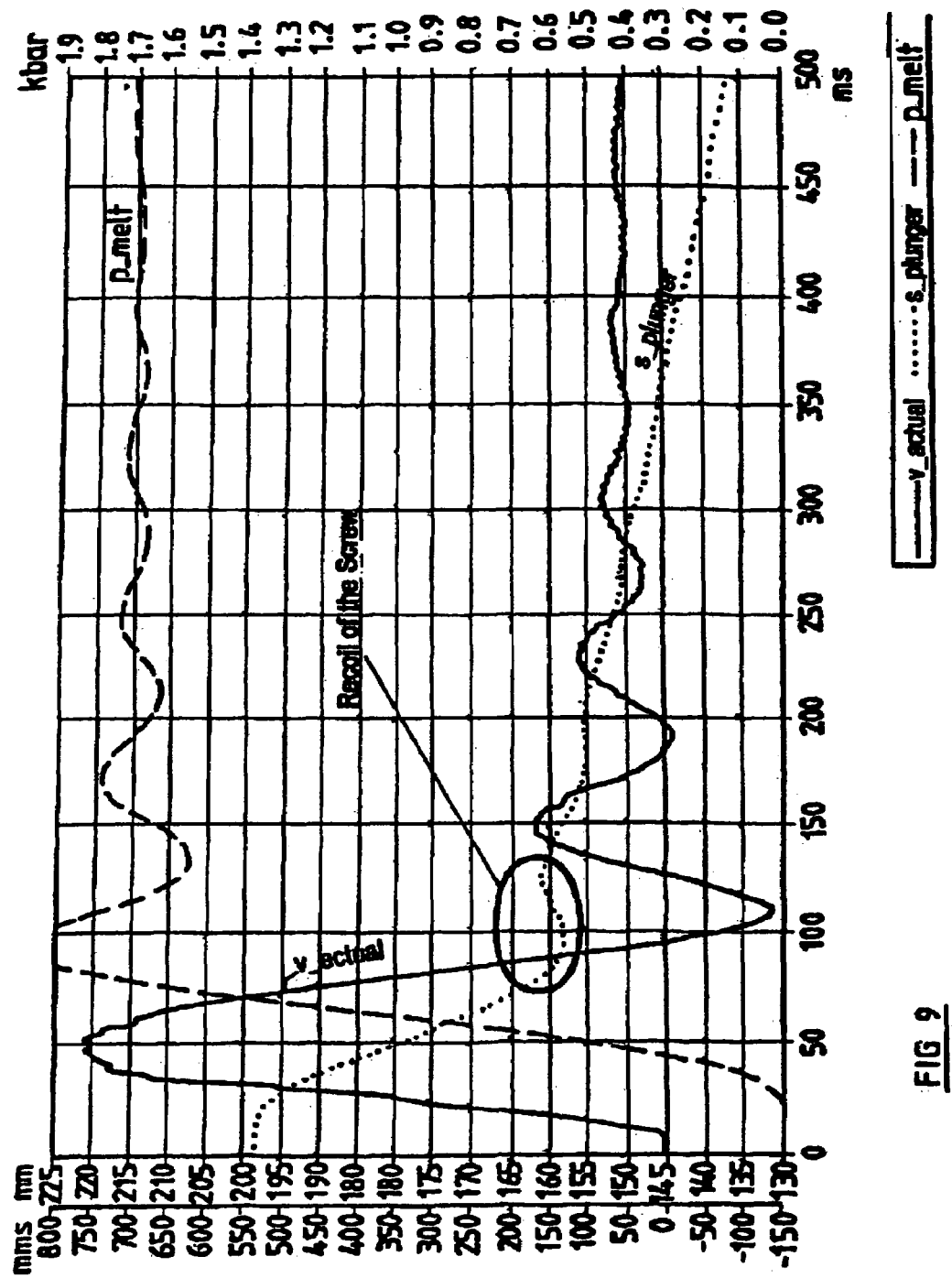
Figure 10:
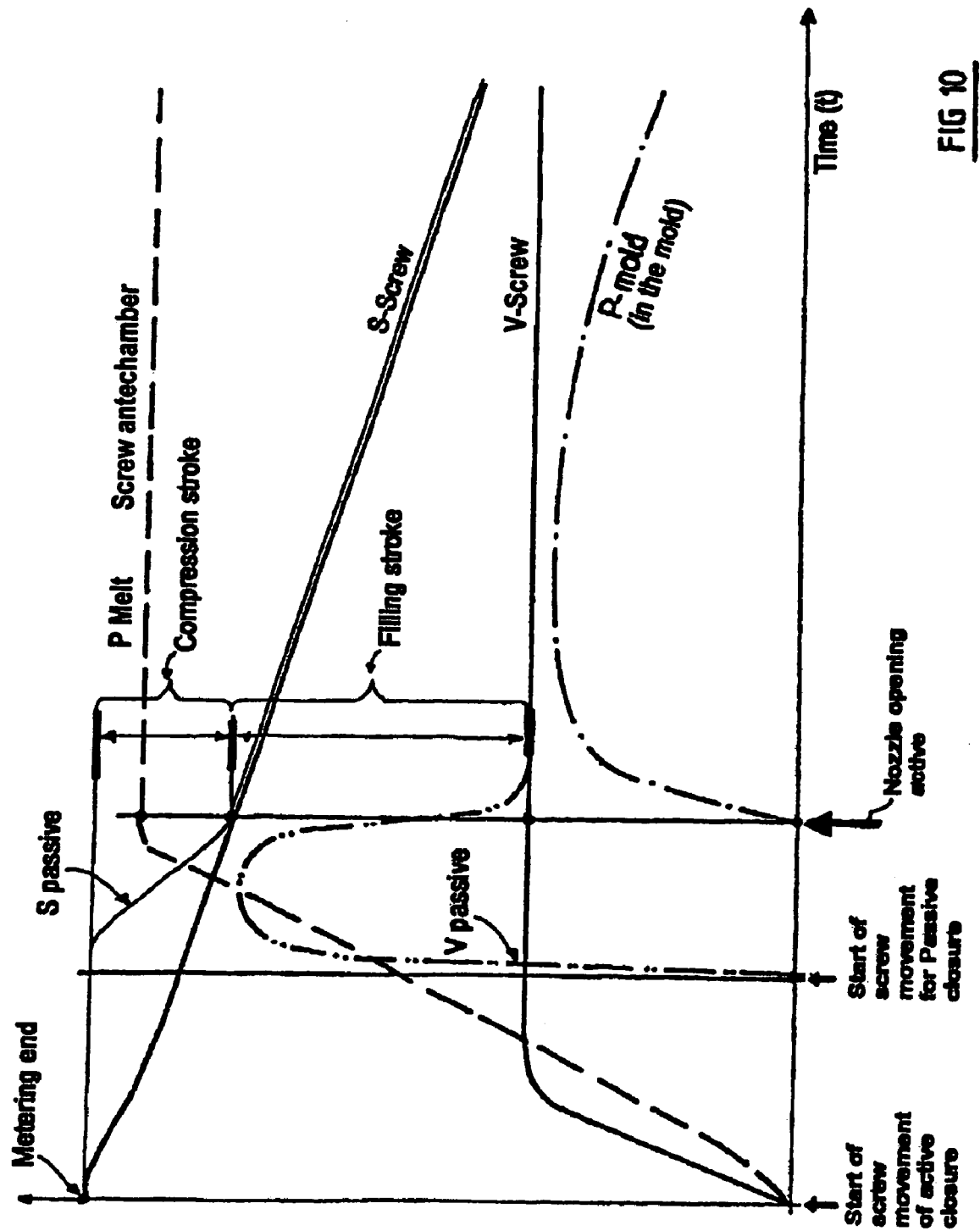
Figure 11:
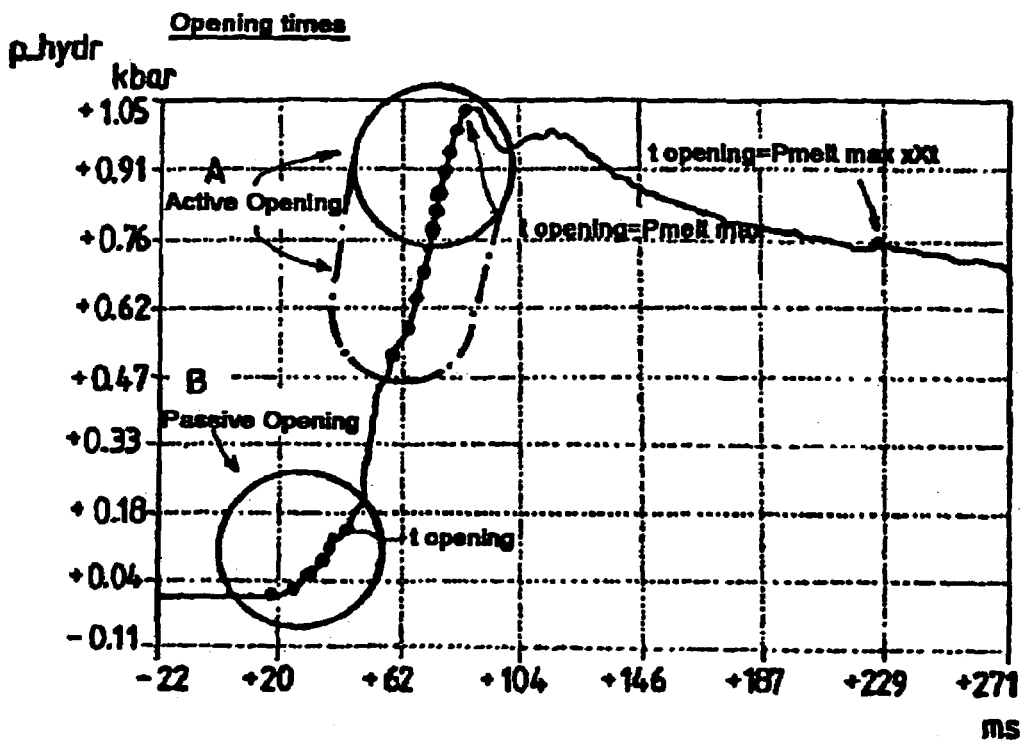
Figure 12:
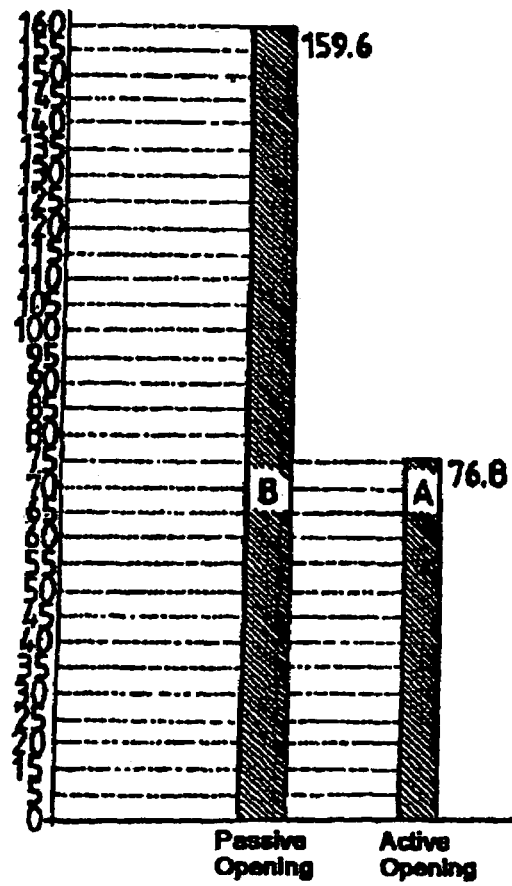

This novel method will now be explained below with additional details on the basis of a few examples. The figures show:

FIG. 1: a diagram of the novel method with a needle valve as the active closure;

FIG. 2a: an example of a state-of-the-art passive closure with a ball gasket and a plate spring;

FIG. 2b: an example of an active closure designed as a needle closure according to the novel method;

FIG. 2c: an example of an active closure with a hydraulically controlled needle according to the novel method;

FIG. 3: the actively operable needle valve according to FIG. 2b on a larger scale for electric or hydraulic needle closure drives;

FIG. 4a: an example of an injection mold with which the experiments were conducted;

FIG. 4b: the mold part of the experimental injection mold in a view according to section IV-IV, also showing the contour of the injection molded articles;

FIG. 5a: schematically one possible explanation for the negative effect with respect to the flow of the melt in the state of the art;

FIG. 5b: the improvement in melt flow rate according to this invention;

FIG. 6: a comparison of active nozzle opening with passive nozzle opening;

FIGS. 7, 8 and 9: three examples of measurement curves from the basic experiments for this novel inventive method;

FIG. 7: compression of the melt against a closed nozzle;

FIG. 8: injection through a nozzle opening of 1 mm diameter at a theoretical flow rate of 200 mm/sec; and FIG. 9: at a theoretical flow rate of 1000 mm/sec;

FIG. 10: the most important parameter curves according to the novel method and the old method;

FIG. 11: a comparison of the opening times with active and passive valve control;

FIG. 12: the time required by the melt A with an active closure system and B with a passive closure system to flow from the nozzle antechamber to the most remote sensor.

METHOD AND EMBODIMENT OF THE INVENTION

FIG. 1 shows schematically an experimental setup for the basic experiments, whereby the mechanical components are shown only in excerpts. In an injection cylinder 1 there is an injection screw 2 having screw flights 3. For the linear drive of the injection screw 2 according to arrow 4, a box M is indicated only schematically with reference number 5. The linear drive may be hydraulic or by electric motor. A position sensor s-schn is shown with reference number 6 and a flow rate sensor v-schn is shown with reference number 7, likewise only schematically. The two sensor values can be obtained from the electronic control unit and/or the corresponding signal generators and computers in the case of using an electric servo motor. Reference is made to European Patent 0 647 175 for the control and regulating technology of electrically driven injection molding machines. Corresponding control lines and signal lines 8, 9 and 10 lead to a control panel 11. An active closure 12 having a needle valve with a valve needle 13 and an operating lever 14 is operated with a controlled drive (arrow 15). The exact lever position s-heb is detected by a potentiometer 16 and the command for a change in position is sent from the controller (control panel 11) over a signal line 17 to the corresponding drive, i.e., arrow 15. The letter K stands for the mold cavity, Esv denotes the injection screw antechamber. The mold cavity K is formed by the two mold halves 18 and 19. For these experiments, the melt pressure p_melt was measured directly in the nozzle antechamber DV by a suitable pressure sensor, and the values were relayed over a charge amplifier 20 to a measurement device 21. Accordingly, the lever position is also reported over a signal line 22 to the electronic measurement system of the measurement device 21. The measurement device 21 and the control panel 11 are connected to a computer 23 by control lines and signal lines 26, 27 having a display screen 24 and input keyboard 25. In approximate terms, the chronological function sequence for a casting cycle is as follows:

mold closing
    compression of melt               time
        delayed opening of the needle
         · start of injection
        injection/dwell pressure
           time needle fully open
                                  metered addition
    total cycle time A central aspect of this new investigation is the separation of the command "start injection" and the control command "needle opening" in time and/or the actual injection into the cavity K of the molds 18, 19. Suitable programs can be developed and stored for each concrete case, so that the closure system is controlled, i.e., operated actively at an optimum pressure in the compression space and/or in the nozzle antechamber DV. In this way, the very important random character for the interaction of the start of injection and the opening of the valve can be ruled out, which is necessarily the case with all methods using passive closures.

The injection nozzle forms the forward closure for the plastification unit. During the injection process, the nozzle is pressed against the gate bushing of the mold. It establishes the connection between the plastifying signal and the gate bushing of the mold for the incoming melt. An injection nozzle should meet the following requirements:

hydraulically favorable design
    easy replaceability
    clean sealing
    retaining the temperature of the melt.

Previous development efforts have also been concentrated in the direction of the aforementioned requirements. To prevent material from escaping during the plastification phase, a wide variety of closure nozzles have been used in the state of the art, especially sliding closure nozzles, which are usually spring loaded. Spring-loaded sliding closure nozzles are operated by the action of the pressure of the melt. In many designs, the valve opens already when the nozzle presses against the mold.

FIG. 2a shows as an example a passive closure nozzle having a ball closure according to the state of the art. A ball 30 pressed by a special plate spring 31 having crosswise slots assumes the sealing function in this design with respect to the through-opening 32 of the nozzle body 33. The plate spring 31 is held between the nozzle body 33 and a nozzle head 34, which has the transfer opening 35 into the corresponding mold channel opening.

FIG. 2b shows an example of an active closure. This is a plunger nozzle having a radially sealing needle closure with a plunger nozzle head 40 which is inserted into a mold plate nozzle 40. A heating strip 42 ensures that the melt temperature is maintained. The closure needle or valve needle 13 is displaceably mounted in a nozzle insert 43 and is moved in a controlled manner or held in position by the operating lever 14. A device for centering the plunger nozzle head 40 is labeled with reference number 44. The drive of the actuating lever 14 may be a hydraulic or electromechanical drive. It is important for the design to allow rapid movement under high melt pressures.

FIG. 2c shows schematically a purely hydraulic drive for both linear injection screw movement and for active movement of the closure needle via a hydraulic cylinder 50. The injection screw 2 is moved on a linear path by a hydraulic drive 51. The entire injection unit 52 with the nozzle head 34 is held by columns 53 and is moved into the injection position against a stop by means of another hydraulic drive 54. A throttle 55 has the function of minimizing strikes against the needle movement system. Control of needle movement is ensured by a regulating valve 56 and a control valve 57.

FIG. 3 shows the essential components for the closure needle or valve needle 13 and the operation thereof on a larger scale as a concrete structural design. The movement of the operating lever 14 according to arrow 15 may be accomplished in any desired fashion. Schematically this shows only a power transmission rod 64, which is connected by an articulated joint 61 to the operating lever 14. The operating lever 14 is mounted in a friction-locked mount on the injection cylinder 1 by way of a rotating pin 62 in a joint head 63, whereby the joint head 63 is detachably mounted by bolts 65 on the front end of the injection cylinder 1. This fully ensures rapid replaceability. The melt supply channel 60 is designed with a knee bend having channel pieces 60' and 60" around the area of the rotating bolt and is guided through the ring channel 60''' around the needle lengthening piece 66 and the valve needle itself. Between the nozzle insert 43 and the joint head are mounted intermediate piece 67 and transition piece 68 which connect the plunger nozzle head 40 to the joint head 63 with regard to the transmission of forces. The value needle 13 is mounted so it is axially displaceable in a bore 69 of the joint head 63 via the needle lengthening piece 66. The pivoting movement of the actuating lever 14 necessarily leads to the desired opening and closing movement of the tip of the needle 70 in the corresponding valve seat 71. Instead of the needle valve shown in FIGS. 2b and 3, an essentially known rotary slide closure or a snap slide closure may be used.

FIG. 4a shows a section through a complete injection mold 75, where it can be seen that the intermediate piece 67 is mounted in a plate 73, which is bolted directly to the injection mold. The cavity K yields two identical injection mold parts 76 and 77, each being L-shaped and being connected at the center by the gate/sprue point 78. A plurality of measurement points has been arranged in accordance with the published article cited in the introduction for detection of the entire injection process through measurement technology. For this purpose, eight infrared sensors 79 have been positioned at equidistant positions to record the exact filling operation. In addition, two internal mold pressure sensors, one near the gate and one at a distance from the gate, were installed at the end of the flow path. Each experiments was started with passive needle opening as the basic machine setting. Then they were switched to "active opening." The following abbreviations are used in the diagrams in FIGS. 6 and 7:

| | |
|---|---|
| Mold | wz |
| pressure | P |
| distance | S |
| plunger | Kolb. |
| lever position | s_heb |
| internal mold pressure | p_wz |
| infrared sensors | Front |
| screw speed | v_sch |
| screw position | s_sch |
| melt pressure nozzle antechamber | p_melt |

"Active" means that the closure system is controlled actively according to the novel inventive method, and "passive" means that the closure system is operated according to the state of the art without forced control.

FIGS. 5a and 5b show a comparison of the state-of-the-art method (FIG. 5a) with the novel method (FIG. 5b). In FIG. 5a the valve is already opened at a low melt compression for the startup process. This is indicated schematically with the valve being partially opened. The speed of the melt flowing forward is relatively low. The edge area 80 is cooled immediately. This results in an artificial narrowing of the canal cross section with a corresponding distorted flow rate profile 81. The transfer of volume flow from the screw antechamber to the cavity of the injection mold has a massively negative effect. FIG. 5b shows an idealized diagram of the situation with the novel method, represented symbolically with the valve completely opened. Since the maximum pressure, i.e., the maximum compression energy and also the maximum delivery energy are available suddenly, this yields a broad flow front with an almost maximum flow rate $V_{max}$ over the entire cross section. The flow rate profile 82 is fully developed accordingly. The consequence is a higher flow rate, more rapid filling of the mold and a longer flow path. Thus long parts having thin walls can be produced by injection molding in the shortest possible amount of time. The same thing is also true of the hydraulic drive as well as the electromechanical drive.

FIG. 6 shows very symbolically a comparison between an active nozzle opening and passive nozzle opening. As expected, the two curves for the melt pressure in the screw antechamber active p_melt and passive p_melt directly one above the other during most of the compression phase. In the active p_melt case, the pressure at the end increases by approx. 10%. This is also consistent with the expected result because in the passive case, melt is already beginning to flow out after the start of the compression phase. This is discernible by the forward movement of the lever position passive s_heb, where the valve begins to open immediately. For the full opening distance, the lever requires approx. 100 ms from point ① to point ② in the case of passive opening (without a drive) according to the experimental examples. In the active case (with a drive), the opening movement is delayed with respect to the start of compression, i.e., by approx. 40-50 ms, when considered from point ①. The opening time is only 30-40 ms between points ③ and ④. The pressure active p_melt is uniformly as much as 20% below the pressure passive p_melt. The actual surprise lies in the significant pressure difference between the values active p_wz and passive p_wz. The pressure passive p_wz is approx. 400 bar (0.4 kbar) at point ⑤, whereas the pressure active p_wz is reached between 500 and 550 bar over a long period of time, i.e., at point ⑥, i.e., values more than 25% higher without requiring any additional expenditure of energy for the novel inventive method.

FIG. 7 shows the compression of the melt with the nozzle completely closed. This shows the analogy with the novel method, at least for the pressure curve, during the compression phase. The compression distance amounts to 30 mm. The final pressure in this example is approx. 1.75 kbar.

FIGS. 8 and 9 illustrate the basic problem with state-of-the-art methods. In the example according to FIG. 8, a theoretical flow rate of the screw movement of 200 mm/sec was selected, and in the example according to FIG. 9, a theoretical flow rate of 1000 mm/sec was selected. FIG. 8 shows that the maximum possible "volume flow rate" is 60 mm/sec, and this is at approx. 250 ms. The high screw forward speed of 0-250 ms is practically only converted to melt compression despite the open nozzle.

FIG. 9 shows a very interesting effect, marked with a circle in bold. The dotted line curve s_plunger shows a slight reverse movement over a period of time of approximately 50 ms. The screw springs back slightly. The reason for this is to be found in the effect of reflected waves, which occur only at higher flow rates. The experimental example is at the same time proof that in the state of the art with passive valve opening, an important part of the compression energy is not converted into volume flow rate due to the recoiling pressure reflection waves. This novel method makes it possible to rule out the very negative effect of the reflected waves through controlled opening of the closure, preferably in the area of maximum compression. Volume flow transfer is optimum in all regards.

FIG. 10 shows an idealized curve for the screw speed (v-screw) [and] the path of the screw (s-screw). The melt pressure in the screw antechamber (p_melt) and the pressure in the mold (p_mold) [are shown] in particular for the case of an electric motor screw drive. In the diagram shown here, the closure opens (nozzle opening active) after approximately one-third of the time. The pressure of the melt in the screw antechamber remains approximately constant from the point in time of nozzle opening at maximum pressure. The pressure in the mold increases steeply from zero at first and remains relatively high for a long period of time. This diagram shows that over the time period of nozzle opening, the speed of the screw (v-screw) and the distance traveled by the screw (s-screw) remain steady and unchanged over time (t). The compression stroke of the screw develops without interruption into the screw filling stroke and/or the injection stroke. The motor drive passes through both ranges without interruption because the timing of active nozzle opening is adapted exactly to the compression and the volume transfer. As a comparison, the speed of the screw in passive opening of the closure is shown with dotted lines, corresponding to the distance traveled by the screw (passive) for the traditional state of the art in the hydraulic drive of the injection screw. In passive opening of the nozzle closure, the injection screw is accelerated beyond the required extent at the beginning of the injection cycle so that the speed drops to half for the volume flow transfer.

FIG. 12 shows a comparison of active and passive closure systems where A denotes active opening and B denotes passive opening. The time in milliseconds indicates how much time the melt takes to flow from the nozzle antechamber to the last sensor. In the active closure system of the novel method, 82.8 ms less time (52%) is needed in comparison with the state-of-the-art passive closure system for the melt to travel the same distance.

The invention claimed is:

1. A method for controlling an injection stroke and a compression stroke of an electrically or hydraulically driven injection screw of an injection mold, the injection screw being provided in a chamber, the injection mold being for production to form a thin-walled injection molded articles including a material, the injection mold having a cavity, and an active closure provided between the chamber and the cavity, wherein a transition from compression of a melt to a volume transfer flow is established, the method comprising the steps of:

developing the compression stroke into the injection stroke without interruption; and rapidly opening the active closure in a controlled manner at a desired pressure in the chamber or at a desired compression of the melt within the chamber, wherein a velocity of the injection screw remains substantially unchanged during the opening of the active closure.

2. The method according to claim 1, further comprising facilitating flow into the cavity of the injection mold with an antechamber of the screw,
   wherein the material has a melt pressure,
   wherein the active closure is configured whereby an opening of the active closure takes place in an upper half of a range of the melt pressure of the material in the screw antechamber.

3. The method according to claim 1, wherein an expansion of the material after the material has been compressed and a conversion to flow front velocity takes place in the cavity of the injection mold.

4. The method according to claim 1, wherein during the compression stroke, a rotatory and a translational mass of the injection screw are accelerated and have an energy,
   wherein the energy supports the injection stroke.

5. The method according to claim 1, wherein the injection screw includes a drive with an electric motor, the method further comprising building pressure in an antechamber of the screw before opening the active closure,
   wherein the building pressure yields a kinetic energy in moving parts of the drive at the start of the active closure opening.

6. The method according to claim 1, wherein in an opening of the active closure of the injection screw, the injection screw includes a drive with an electric motor having a rotational speed, the method further comprising accelerating a rotatory and a translational mass of the injection screw during the compression stroke, such that the rotatory and translational mass have an energy, the energy supporting the injection stroke.

7. The method according to claim 1, wherein the compression stroke amounts to up to about 40% of the total screw stroke.

8. The method according to claim 1, wherein the active closure includes a nozzle and a screw antechamber, the method further comprising opening the nozzles,
   wherein during and after the opening of the nozzle, a speed of the injection screw is maintained to prevent a drop in pressure in the screw antechamber.

9. The method according to claim 1, further comprising building pressure in an antechamber of the screw via a driving power and motor power before opening the active closure; and
   continuing the injection stroke after opening the active closure via the driving power and motor power.

10. The method of claim 1, wherein the opening occurs at a maximum pressure of the melt during the compression stroke.

11. An injection unit for injection of a material to form a thin-walled injection molded article, in an injection mold, the injection mold having an electronically or hydraulically driven injection screw and a nozzle opening provided between the injection screw and a mold cavity, and the injection mold including a controllable active closure for the nozzle opening, the injection unit comprising:
   control means for controlling a two-step, uninterrupted linear movement from a compression stroke to an injection stroke of the injection screw, the active closure being operated between the compression stroke and the injection stroke; and
   electric or hydraulic drive means for suddenly opening the active closure,
   wherein a velocity of the injection screw remains substantially unchanged during the opening of the active closure.

12. The injection unit according to claim 11, further comprising a screw antechamber configured to regulate a flow of the material from the injection screw to the active closure,
   wherein the material has a melt pressure,
   wherein the control means and the active closure are configured whereby an opening of the active closure is implementable in an upper half of a range of the melt pressure of the material in the screw antechamber.

13. The injection unit according to claim 11, further comprising a screw antechamber configured to regulate a flow of the material from the injection screw to the active closure,
   wherein the material has a melt pressure,
   wherein the control means and the active closure are configured whereby an opening of the active closure is implementable in an upper fourth of a range of the melt pressure of the material in the screw antechamber.

14. The injection unit according to claim 12, wherein the electric or hydraulic drive means are configured to open the nozzle for less than about 50 milliseconds.

15. The injection unit according to claim 11,
   wherein the active closure is arranged on the nozzle opening of the injection screw,
   wherein the active closure is one of a needle valve, a plug slide valve, and a rotary slide valve.

16. The injection unit according to claim 11, wherein the injection mold includes a cavity, the cavity including an inlet area,
   the active closure is arranged in an inlet area of the cavity of the injection mold, and
   the active closure is one of a needle valve, a plug slide valve, and a rotary slide valve.

17. The injection unit according to claim 11, wherein a combination of the compression stroke and the injection stroke can be implemented cyclically with each injection in accordance with the size of the injection mold,
   wherein only a small cushion of the material remains at the end of the injection stroke.

18. The injection unit according to claim 11, further comprising an electric power system for the injection screw, the electronic power system including a computer means, a controller, and a regulator.

19. The injection unit according to claim 11, further comprising program memories and computers configured to coordinate the opening of the active closure,
   wherein the material has a melt compression,
   wherein the opening of the active closure corresponds to the melt compression of the material.

20. The injection unit of claim 11, wherein the material is a melt, and the opening occurs at a maximum pressure of the melt during the compression stroke.

* * * * *